Figure 1A:
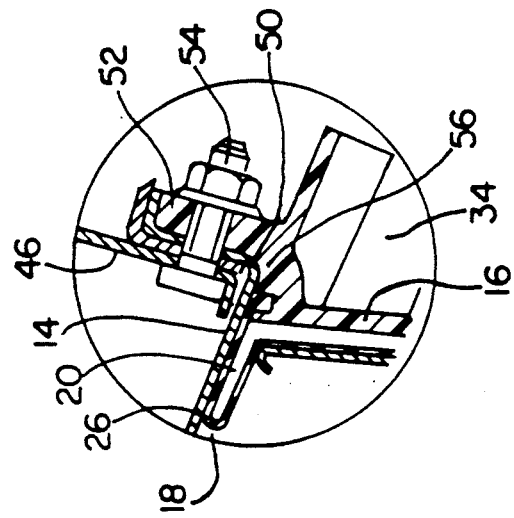

United States Patent [19]

Moinard et al.

[11] Patent Number: 5,201,179
[45] Date of Patent: Apr. 13, 1993

[54] BRAKE SUBASSEMBLY FOR A VEHICLE

[75] Inventors: Patrice Moinard, Montreuil; Philippe Castel, Paris, both of France

[73] Assignee: Bendix Europe Services Techniques, Drancy, France

[21] Appl. No.: 880,788

[22] Filed: May 11, 1992

[30] Foreign Application Priority Data

May 28, 1991 [FR] France ................. 91 06377

[51] Int. Cl.⁵ .......................... B60T 13/00; F15B 9/10
[52] U.S. Cl. .................. 60/547.1; 91/369.1; 91/376 K; 92/98 R; 92/99
[58] Field of Search ............... 91/369.1, 369.2, 369.3, 91/376 R; 92/96, 98 R, 99, 161; 60/547.1; 192/13 R

[56] References Cited

U.S. PATENT DOCUMENTS

| | | | |
|---|---|---|---|
| 2,902,008 | 9/1959 | Price et al. | 91/376 R |
| 4,350,077 | 9/1982 | Takeuchi | 91/376 R |
| 4,441,596 | 4/1984 | Nakahara et al. | 192/13 R |
| 4,469,008 | 9/1984 | Seki | 91/376 R |
| 4,917,000 | 4/1990 | Fecher | 91/369.2 |
| 5,027,693 | 7/1991 | Wilkinson | 92/99 X |

FOREIGN PATENT DOCUMENTS

| | | | |
|---|---|---|---|
| 2814419 | 10/1979 | Fed. Rep. of Germany | |
| 3346140 | 7/1985 | Fed. Rep. of Germany | 91/369.2 |
| 2636286 | 3/1990 | France | |
| 2074269 | 10/1981 | United Kingdom | 91/369.2 |
| 2160603 | 12/1985 | United Kingdom | |

Primary Examiner—Edward K. Look
Assistant Examiner—Hoang Nguyen
Attorney, Agent, or Firm—Larry J. Palguta; Ken C. Decker

[57] ABSTRACT

The invention relates to a brake subassembly for a vehicle having an engine compartment and a passenger cell separated by a bulkhead (46), the subassembly comprising: a pneumatic boost servomotor controlled by way of a pedal (28) and intended to be fixed to the bulkhead (46), the servomotor comprising, coaxially, a front shell (14), having a cylindrical wall, and a rear cover (16) and having, on the inside, two chambers (18, 20) separated in leaktight fashion by a piston (22) provided with a diaphragm (26) ensuring leaktightness between the two chambers, a master cylinder (10) fixed to the front shell (14) and at least one brake pedal (28). According to the invention, the shell (14) and the cover (16) are each provided with a radial peripheral rim, the rim (52) of the cover bearing directly on that (50) of the shell, which bears on the bulkhead (460 on the passenger-cell side; the cover (16) has a circular centering tongue (56), which projects into the servomotor and the inner end of which comes to compress radially the peripheral end of the diaphragm (26) on the cylindrical wall of the shell (14), and a plurality of mutually parallel ribs (36) which project from its exterior wall and certain of which (34) constitute support pieces (34) for the pivot (32) of the pedal (28).

4 Claims, 1 Drawing Sheet

BRAKE SUBASSEMBLY FOR A VEHICLE

The present invention relates to a brake subassembly for a vehicle having an engine compartment and a passenger cell separated by a bulkhead, said subassembly comprising: a pneumatic boost servomotor controlled by means of a pedal and intended to be fixed to said bulkhead, said servomotor comprising, coaxially, a front shell, having a cylindrical wall, and a rear cover and having, on the inside, two chambers separated in leaktight fashion by a piston provided with a diaphragm ensuring leaktightness between the two chambers, a master cylinder fixed to the front shell and at least one brake pedal.

Such subassemblies are well known in the art. Documents U.S. Pat. No. 3,137,361, EP-A-0 104 105, U.S. Pat. No. 4,022,112, among others, describe known examples thereof.

As a general rule, the rear cover of the servomotor is fixed to the bulkhead in the engine compartment via a plate, to which is fixed a support piece in which the pivots of the various pedals are mounted in captive fashion.

With this type of subassembly, the fitting of the subassembly in the vehicle is a delicate operation which is difficult to automate.

In the abovementioned U.S. Pat. No. 3,137,361, the cover is formed by shaping the bulkhead to which the support piece of the pedals is fixed. The assembly of the components of the servomotor then has to be effected on the assembly line for the vehicle, likewise making the operation very delicate.

Moreover, the forces engendered upon braking are very large, resulting in fixing problems between the shell and the cover of the servomotor since, in an assembly such as that described in U.S. Pat. No. 4,022,112, all the forces pass via the joint between these two pieces. With this end in view, according to EP-A-0 104 105, the shell is fixed directly to the bulkhead in the engine compartment. In this case, the forces are exerted not on the joint between the cover and the shell but between the shell and the set of bolts for fixing the shell to the bulkhead. This shifts the fixing problem but does not eliminate it.

Finally, there remains a problem of leaktightness between the two interior chambers of the servomotor and between these and the exterior of the servomotor in the zone in which the cover and the shell of the servomotor are joined.

In the solution described in U.S. Pat. No. 4,022,112, this problem is resolved by trapping the peripheral end of the sealing diaphragm between the cover and the shell of the servomotor, then crimping the two pieces to one another during the application of a high axial pressure between the two. This embodiment makes the fabrication of the servomotor costly and gives rise locally to possible zones of corrosion. In the embodiment described in EP-A-0 104 105, the cover carries a piece which comes to compress radially the peripheral end of the diaphragm on the cylindrical wall of the shell.

However, upon assembly of the components of the servomotor, the centering of the cover on the shell is ensured only by the end of the diaphragm and, consequently, lacks precision.

Finally, with the servomotors of the prior art, there remains a problem of dismountability in the case of intervention, whether in the course of the life or at the end of the life of the vehicle thus equipped.

The present invention aims to obviate the above-mentioned disadvantages with an improved servomotor which is easy to fit in the vehicle, does not require an intermediate plate, controls the forces involved and allows easy and precise assembly to be ensured without a complex operation.

According to the invention, the subassembly is such that, in combination:

shell and cover are each provided with a radial peripheral rim, the rim of the cover bearing directly on that of the shell, which bears on the bulkhead on the passenger-cell side;

the cover has a circular tongue which projects into said servomotor and the inner end of which comes to compress radially the peripheral end of said diaphragm on the cylindrical wall of said shell and;

the cover has a plurality of mutually parallel ribs which project from its exterior wall and certain of which constitute support pieces for the pivot of the pedal.

Figure 1:
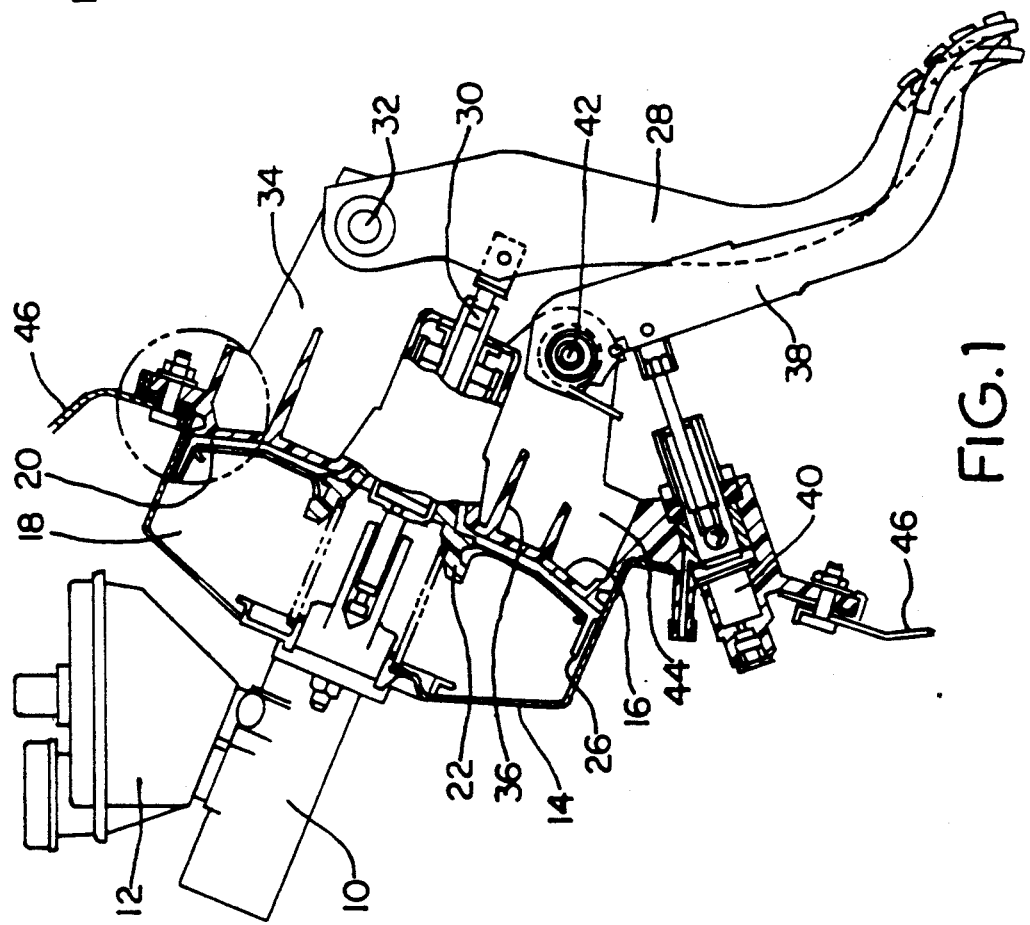

The invention will now be described by way of example with reference to the accompanying drawings in which:

FIG. 1 represents schematically, in section, a subassembly according to the invention, and FIG. 1A is an enlargement of the circled portion of FIG. 1.

Referring now to this single figure, the person skilled in the art will recognize a master cylinder 10 provided with its reservoir 12 of fluid under low pressure.

The master cylinder 10 is fixed to the shell 14 of a servomotor. This shell 14 is closed by a cover 16.

In a conventional manner, the servomotor comprises two chambers 18, 20 separated from one another by a piston 22, leaktightness being ensured by an unrolling diaphragm 26.

The brake pedal 28 is constituted by a lever allowing control of a pushrod 30 of the servomotor by rotation about a pivot 32.

This pivot is held captive by a support piece 34 integral with the cover 16 and constituted by certain of the ribs arranged on the cover.

Likewise represented in the figure is a clutch pedal 38 controlling a clutch transmitter 40 and the pivot 42 of which is likewise held captive by a support piece 44 constituted by ribs provided in the cover. The clutch transmitter 40 is preferably integrated into the cover 16 of the servomotor.

As better represented in the enlarged part of the figure, the subassembly is mounted on the bulkhead 46 via the passenger cell.

Both the cover and the shell comprise a radial peripheral rim 50, 52 bearing on each other, the rim 50 of the shell bearing on the bulkhead 46 on the passenger-cell side. A fixing means, such as bolts 54, fixes the assembly.

Thus, in the event of braking, the forces exerted both on the shell 14 and on the cover 16 are transmitted directly to the bulkhead 46 without any intermediate piece.

Furthermore, there is a total separation of the forces, which can thus no longer be transmitted from the cover to the shell and vice versa. By virtue of this fact, crimping between the shell and the cover is no longer necessary, greatly simplifying the fabrication of the servomotor.

The cover 16 comprises a circular tongue 56 projecting inside the servomotor in such a way as to ensure the centering of the cover 16 on the shell 14.

The end of this tongue is grooved in such a way as to receive the peripheral end of the diaphragm 26 and to compress the latter radially against the cylindrical part of the shell 14.

By virtue of this simpler design, it is possible to make the cover 16 of a rigid material of the thermosetting type rather than of sheet metal as is customary, allowing the assembly to be made lighter. The plurality of ribs 36 formed on the rear part of the cover 16 then allows the latter to be reinforced and to distribute the forces applied to the cover uniformly.

Furthermore, certain of these ribs advantageously constitute the support pieces of the pivots 32, 42 of the pedals 28, 38.

The internal wall of the cover 16 advantageously comprises ribs 17 making it possible to do away with the necessity for the usual beads in the diaphragm intended to prevent the diaphragm 26 from sticking to the cover 16, thus affecting the functioning of the servomotor.

Although only one preferred embodiment of the invention has been described and represented, it is evident that any modification made by a person skilled in the art would not exceed the scope of the invention.

We claim:

1. A brake sub-assembly for a vehicle having an engine compartment and a passenger cell separated by a bulkhead, said sub-assembly comprising a pneumatic booster servomotor controlled by means of a pedal and fixed to said bulkhead, said servomotor comprising, coaxially, a front shell having a cylindrical wall and a rear cover and having, on the inside, two chambers separated in leaktight fashion by a piston provided with a diaphragm ensuring leaktightness between the two chambers, a master cylinder fixed to the front shell and at least one brake pedal, said sub-assembly being characterized by the following features in combination:

the shell and cover each provided with a radial peripheral rim, the rim of the cover bearing directly on that of the shell which bears on the bulkhead at a passenger-cell side;

said cover having a circular centering tongue which projects into said servomotor to engage radially and ensure the centering of the cover on the shell, and an end of the centering tongue grooved and receiving a peripheral end of said diaphragm so as to compress the diaphragm radially against the cylindrical wall of said shell; and said covering having a plurality of reinforcing ribs which project from an exterior wall and certain of which constitute support pieces for a pivot of the brake pedal and distribute uniformly forces applied to the cover.

2. The sub-assembly according to claim 1, characterized in that other ribs constitute support pieces for a pivot of a clutch pedal.

3. The sub-assembly according to claim 2, characterized in that a clutch transmitter is integrated with said cover.

4. The sub-assembly according to claim 1, characterized in that an interior wall of said cover has ribs.

* * * * *